United States Patent
Lee (10) Patent No.: US 9,429,144 B2
(45) Date of Patent: Aug. 30, 2016

(54) ELECTRICITY-GENERATING SYSTEM USING SOLAR HEAT ENERGY

(71) Applicant: Jong Eun Lee, Gangwon-do (KR)

(72) Inventor: Jong Eun Lee, Gangwon-do (KR)

(73) Assignee: Jong Eun Lee, Pyeongchang-gun, Gangwon-do (KR)

( * ) Notice: Subject to any disclaimer, the term of this patent is extended or adjusted under 35 U.S.C. 154(b) by 286 days.

(21) Appl. No.: 14/358,292

(22) PCT Filed: Nov. 14, 2012

(86) PCT No.: PCT/KR2012/009585
§ 371 (c)(1),
(2) Date: Jul. 18, 2014

(87) PCT Pub. No.: WO2013/073823
PCT Pub. Date: May 23, 2013

(65) Prior Publication Data
US 2015/0033739 A1 Feb. 5, 2015

(30) Foreign Application Priority Data
Nov. 15, 2011 (KR) .................. 10-2011-0118649

(51) Int. Cl.
| | |
|---|---|
| *F03G 6/00* | (2006.01) |
| *F01K 1/00* | (2006.01) |
| *F03G 6/06* | (2006.01) |
| *F24J 2/08* | (2006.01) |
| *F24J 2/34* | (2006.01) |
| *F28D 20/02* | (2006.01) |
| *F01K 15/00* | (2006.01) |
| *F28D 20/00* | (2006.01) |

(52) U.S. Cl.
CPC ............... *F03G 6/065* (2013.01); *F01K 15/00* (2013.01); *F24J 2/08* (2013.01); *F24J 2/34* (2013.01); *F28D 20/02* (2013.01); *F28D 20/021* (2013.01); *F28D 2020/0047* (2013.01); *Y02E 10/46* (2013.01); *Y02E 60/145* (2013.01); *Y02E 70/30* (2013.01)

(58) Field of Classification Search
CPC ...... F03G 6/065; F28D 20/021; F28D 20/02; F28D 2020/0047; F01K 15/00; F24J 2/08; F24J 2/34; Y02E 70/30; Y02E 60/145; Y02E 10/46
USPC .................... 60/641.8–641.15, 659
See application file for complete search history.

(56) References Cited

U.S. PATENT DOCUMENTS

| | | | | |
|---|---|---|---|---|
| 2,902,028 A | * | 9/1959 | Manly | B01D 1/04 122/235.11 |
| 4,055,161 A | * | 10/1977 | Jones | F24J 2/14 126/580 |
| 4,318,890 A | * | 3/1982 | Monahan | B01D 53/22 422/233 |
| 2009/0199557 A1 | * | 8/2009 | Bennett | F01K 3/008 60/641.15 |

(Continued)

*Primary Examiner* — Hoang Nguyen
(74) *Attorney, Agent, or Firm* — Paratus Law Group, PLLC (57) ABSTRACT

An electricity-generating system using solar heat energy comprises: a heat storage tank, a pair of heat-sensitizing units with valves, a steam turbine, a solar collecting system comprising a fixed body in the form of a mesh net having mesh openings, a condenser lens coupled to each of the mesh openings of the fixed body, a condenser unit installed at the bottom portion of the fixed body, which includes a collector lens that increases the concentration of energy focused through the condenser lens and transfers heat to the bottom of the body thereof; a heat storage tank combined with the bottom portion of the fixed body, which heats and stores the heat storage medium by heat energy transferred through the collector lens; a circulation conduit which has an upper plate-shaped coiled tube and a lower coiled circulation tube, which is stacked and contained in the heat storage tank.

1 Claim, 4 Drawing Sheets

(56) References Cited

U.S. PATENT DOCUMENTS

| | | | | |
|---|---|---|---|---|
| 2012/0111006 A1* | 5/2012 | Varga | ........................ | F24J 2/07 60/641.15 |
| 2014/0026883 A1* | 1/2014 | Chen | ........................ | F24J 2/07 126/600 |
| 2014/0318128 A1* | 10/2014 | Kerns | ........................ | F03G 6/065 60/641.15 |

* cited by examiner

ELECTRICITY-GENERATING SYSTEM USING SOLAR HEAT ENERGY

TECHNICAL FIELD

The present invention relates to an electricity-generating system using solar heat energy and, more particularly, to an electricity-generating system that concentrates solar heat during the daylight hours through a condenser lens at a collector lens, heats a heat storage medium and steam in a latent heat state through the collector lens so as to produce a sensible heat state, drives a generator using the discharge of steam pressure, and in the remaining time, heats the latent heat steam in a heat storage tank in which the heat storage medium is contained so as to drive the generator and generate electricity.

BACKGROUND ART

Generally, solar energy is clean energy which does not generate any air pollution, noise, heat generation, vibration, etc. The solar energy does not require fuel transport and maintenance of power generating facilities, and in the solar energy, it is easy to select a place for installation of facilities, the scale of the facilities may be freely chosen, the lifespan of the facilities is long, and the installation is easy.

The solar energy generation is divided into tracking type, semi-tracking type, and fixed type solar cell equipment according to the level of the change of direction along the position of the sun in order to maximize the generation capacity.

First, the tracking array is a scheme for maximizing electricity generation efficiency, and is a scheme of tracing the position of the sun through power and device operation so that the direct ray of light may become vertically incident upon the front surface of the solar cell module.

Such an automatic tracking type solar cell is divided into a position information programming system by the meridian information and an optical sensor automatic tracking system according to the type of the tracking system.

Next, the semi-tracking array is a scheme of vertically changing the tilt angle of the solar cell array according to the season or month, and is a scheme which generally changes the tilt angle seasonally.

The power output of the semi-tracking array is between the fixed type and the tracking type, and the power output is usually greater than the fixed type by about 20%.

In the above power generation system, the fixed type system is a cheap and stable structure and is widely used in places without limitation in the area of installation in a relatively remote region, and the fixed type system is generally installed in places with strong wind.

Furthermore, the tracking array has a low power generation efficiency compared to the semi-fixed type, but the initial installation costs are low and personnel expenses and risks according to the repair and maintenance are low, and thus the tracking array is relatively widely used.

Furthermore, in consideration of geographical characteristics that the installation area on the ground is not sufficient, the method of generating electricity from the solar energy using a building integrated photovoltaic system (BIPV) and supplying the electricity to consumers is also used, but there is a limit due to the shape of the building, and thus there has been a need for an efficient solar light condensation technology.

Furthermore, the photovoltaic module, which is used in the solar light power generation system, is mainly of a flat type, and the flat photovoltaic module is configured to form a unit photovoltaic module string which may generate a unit voltage which is set by serial connection of photovoltaic cells of a regular size (e.g., 125 mm×125 mm) and to generate necessary power (=current×voltage) by serial or parallel connection of a certain number of photovoltaic cells.

Hence, if the solar light is irradiated, the flat type photovoltaic module generates direct electricity which is required by the photoelectric effect of respective photovoltaic cells which form the photovoltaic strings.

Furthermore, the direct power generated by the flat type photovoltaic module is directly used or is used after being converted into alternating current using an inverter.

Furthermore, generally, the photovoltaic cell with the area size of 125 m×125 m of crystalline silicon (Si) has the electric characteristics that the open circuit voltage is about 0.6V, the short-circuit current is about 3 to 6 A, and the maximum power is generating the direct power of about 1.2 to 2.5 W according to the efficiency of the photovoltaic cell in the standard condition (the airmass of 1.5, solar radiation of 1000 W/m$^2$, and the surface temperature of the photovoltaic cell of 25° C.).

Hence, when the efficiency of the flat type photovoltaic cell module is about 15%, the flat type photovoltaic module, in which the area of photovoltaic cells is 1 m$^2$ in the above-stated standard condition, may generate the power of about 150 50 W.

Furthermore, the photovoltaic cells of the flat type photovoltaic module mainly use silicon (Si) which is an expensive semiconductor material, and thus the photovoltaic cells are expensive and the price of the semiconductor silicon (Si) occupies more than 50% of the module price.

Hence, there is a need for a solution to reduce the unit cost of the photovoltaic module or reduce the area of use of the photovoltaic cell for the same power, and one of the solutions is a concentrating photovoltaic module which adds a concentrating device for increasing the high optical absorption density by concentrating solar light.

However, in the conventional photovoltaic module, the unit electric power, which is generated for the unit area, increases according to the concentration ratio of the device, and thus the unit costs of the installation could be reduced only by assembling a large number of flat type modules.

Hence, there is a need for a wide space for installing the photovoltaic module, and the device needs to be installed only in an area with long daylight hours.

Furthermore, the energy, which is generated in the photovoltaic module, needs to be used to drive the photovoltaic module along the meridian of the sun, and thus the efficiency according to the energy loss decreases.

DISCLOSURE

Technical Problem

An object of the present invention is to provide an electricity-generating system that concentrates solar heat during the daylight hours through a condenser lens at a collector lens, heats a heat storage medium and steam in a latent heat state through the collector lens so as to produce a sensible heat state, drives a generator using the discharge of steam pressure, and in the remaining time, heats the latent heat steam in a heat storage tank in which the heat storage medium is contained so as to drive the generator and generate electricity.

Another object of the present invention is to provide an electricity-generating system which heats a heat storage medium by a collector lens at the time of radiation of solar light regardless of the direction of the meridian by having a configuration of continuous arrangement of condenser lenses on a spherical frame and concentrating the density of heat energy to the collector lens by the condenser lens.

Another object of the present invention is to provide an electricity-generating system which enhances the output efficiency, easily removes alien materials which are piled up on the condenser unit composed of a condenser lens and a collector lens, and minimizes an energy loss by having a generation unit under the ground.

Technical Solution

In order to solve the above problem, there is provided an electricity-generating system using solar heat energy including:

a fixed body (11) in the form of a mesh net having mesh openings, which has a spherically-shaped top portion extending above the ground;

a condenser lens (12) coupled to each of the mesh openings of the fixed body (11), which focuses sunlight at the bottom portion of the fixed body (11);

a condenser unit (10) installed at the bottom portion of the fixed body (11), which includes a collector lens (13) that increases the concentration of energy focused through the condenser lens (12) and transfers heat to the bottom of the body thereof;

a heat storage tank (30) combined with the bottom portion of the fixed body (11), which has a heat storage medium (40) filled inside the body thereof, and which heats and stores the heat storage medium (40) by means of heat energy transferred through the collector lens (13);

a circulation conduit (50) which has an upper plate-shaped coiled tube (51) and a lower coiled circulation tube (52), which is stacked and contained in the heat storage tank (30), and which selectively moves steam to each component through the operation of a valve of a circulation pump (53);

a generator (60) for generating electricity when steam in the upper plate-shaped coil tube (51) of the circulation conduit (50) is heated and converted to a sensible heat state in the heat storage tank (30) and the sensible heat steam is discharged in order to drive a steam turbine (61);

a first heat-sensitizing unit (70a) for further thermally contracting the sensible heat steam that passes through the generator (60); and a generating unit (20) having latent heat steam that is thermally contracted by the generator or the first heat sensitizing unit (70a) pass through the lower coil circulation tube (52) of the circulation conduit (50) and through the inside of the heat storage tank (30) to be heated, and including a second heat-sensitizing unit (70b) thermally contracting the heated sensible heat steam.

wherein the heat storage medium (40) in the heat storage tank (30) is heated by the condenser unit (10) and performs heat exchange with the upper plate-shaped coil tube (51) and the lower coil circulation tube (52) in the tank, sensible heat steam is fed therein, the sensible heat steam discharged through the upper plate-shaped coil tube (51) drives the steam turbine (61) in order to generate electricity, latent heat steam is further thermally contracted when passing through the first valve (54a) and the first heat-sensitizing unit (70a), the latent heat steam is supplied to the lower coil circulation tube (52) through a second valve (54b) so as to exchange heat with the heat storage medium (40), and the sensible heat steam heated in the lower coil circulation tube (52) is thermally contracted when passing through a third valve (54c) and the second heat-sensitizing unit (70b), and is supplied to the upper plate-shaped coil tube (51) through a fourth valve (54d) in order to be circulated.

Advantageous Effects

According to the present invention, the power and the tool, which need to operate the photovoltaic module according to the existing meridian information, are not used, and by installing a plurality of condenser lenses, the solar light is concentrated on the collector lens regardless of the direction of the meridian so that the electricity may be generated by heating the heat storage medium and steam.

Furthermore, according to the present invention, solar light is concentrated through a plurality of condenser lenses so as to generate high temperature heat without a collector lens, and by heating the heat storage medium and steam with this heat energy, it can also be used in an area without short daylight hours.

Hence, by improving the power-generation efficiency of solar light, economical efficiency increases and natural environments are also preserved.

DETAILED DESCRIPTION OF EXEMPLARY EMBODIMENTS

Hereinafter, embodiments of the present invention will be described with reference to the attached drawings.

The present invention relates to an electricity-generating system that concentrates solar heat during the daylight hours through a condenser lens at a collector lens, heats a heat storage medium and steam in a latent heat state through the collector lens so as to produce a sensible heat state, drives a generator using the discharge of steam pressure, and in the remaining time, heats the latent heat steam in a heat storage tank in which the heat storage medium is contained so as to drive the generator and generate electricity.

First, the present invention includes a condenser unit 10 where heat energy is generated by being exposed to the ground and concentrating solar light, and a generation unit 20 which is installed under the ground, circulates the condenser unit 10, stores heat energy, and generates electricity by reusing the hear energy.

Figure 2:
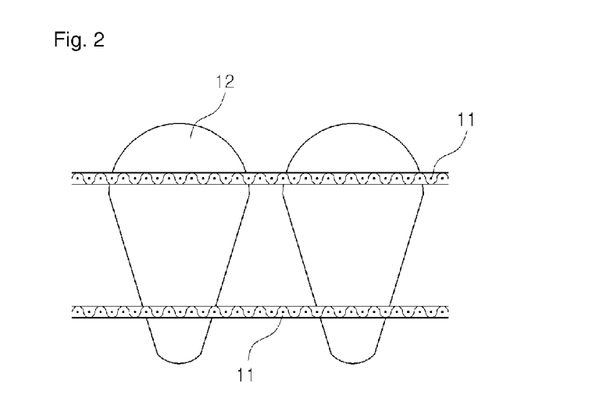
FIG. 2 is an enlarged cross-sectional view of a condenser lens of the present invention.

In the condenser unit 10, as shown in FIG. 2, a spherical fixed body 11 is made in a mesh net shape with mesh openings and each condenser lens 12 is coupled to the mesh openings, and each solar light needs to be fixed to be concentrated on the bottom of the fixed body 11 at the time of fixing the condenser lens 12.

Furthermore, the fixed body 11 may be set so that the position of the fixed condenser lens 12 is not moved even in a rough natural environment by fixing the upper part and the lower part of the condenser lens and with a dual mesh net.

At this time, the condenser lens 12 has a conical body, and convex lenses are formed on the upper part or on both the upper and lower parts, and a reflective surface is formed inside the conical body to reflect light to the lower part.

Furthermore, a collector lens 13 is installed on the bottom of the fixed body 11, and as heat energy, which is concentrated though a plurality of condenser lenses 12, is passed through, heat energy with a high density is transmitted to the heat storage medium 40 formed on the bottom of the condenser unit 10.

Hence, solar light is converted into heat energy through the condenser unit 10, and electricity is generated using the heat energy in the generation unit 20 installed under the ground.

The generation unit 20 includes a heat storage tank 30, a generator 60, first and second cooling units 70a and 70b, a circulation pump 53, and a circulation conduit 50. Here, the circulation conduit 50 connected to each component is set to control the movement of the steam by the value.

At this time, the circulation conduit 50 is set to be stacked and contained with the upper plate-shaped coiled tube 51 and the lower coiled circulation tube 52 inside the heat storage tank 30, and includes first, second, third, and fourth values 54d along the conduit, through which the moving direction of the circulating steam may be adjusted.

Furthermore, a heat sensor (not shown), which senses the inner temperature of the circulation conduit 50, is included in the value, and the value adjusts the moving direction of the moving steam along the circulation conduit 50 along the setting temperature of the sensor.

Hence, the steam, which is moved along the circulation conduit 50 with the operation of the circulation pump 53, may control the movement to each component according to whether the value is opened, and may adjust the steam circulation operation by sensing the hours other than the daylight hours.

Here, the heat storage tank 30 is heated as the heat energy with high density is directly transmitted to the heat storage medium in the state that the heat storage medium is filled inside. The upper flat-shaped coiled tube 51 and the lower coiled circulation tube 52 of the circulation conduit 50 inside the tank have a coil shape between the heat storage media and are contained in the upper and lower sides so as to enhance the efficiency of the heat exchange with the heat storage medium 40.

Likewise, the heat storage tank 30 may store heat inside for a long time by preventing the spread of heat to the outside while maintaining the high temperature and high pressure inside the body.

Hence, first, the upper plate-shaped coiled tube 51 is heated trough the heat storage medium 40 inside the heat storage tank 30, and the heat exchange is easily and quickly is performed due to the top portion and the horizontal coiled shape.

Furthermore, the condenser lens 12, the collector lens 13, the heat storage tank 30, and the circulation conduit 50 are made of heatproof materials such as ceramic, alloys covered with ceramic, silicon carbide, alumina, special kind stainless steel, nickel alloy, etc.

Furthermore, the heat storage medium 40 is made of a material which absorbs heat by direct heat exchange by the collector lens 13, and salt, etc., which are stable in the atmospheric pressure and have relatively high specific heat and the heat of fusion, are used.

Such materials become very efficient means for energy storage because heat may be absorbed until the temperature goes up until the melting point and a large amount of heat for each unit weight may be absorbed due to the high heat of fusion.

The salt is only one possible material, and other hear energy storage materials such as imidazole, imidazolium chloride, pyrrole derivatives, and other similar compounds may be used.

The generator 60 generates electricity by driving the steam turbine 61 inside the body as the steam inside the circulation conduit 50 is supplied and sprayed in the heated sensible heat state in the heat storage tank 30.

Furthermore, first and second cooling units 70a and 70b lower the temperature of the steam so as to reduce the volume. In the state where the entire part of the circulation conduit 50 is in the sensible heat state, the steam movement is limited, but the steam may be moved along the inside of the circulation conduit by changing the steam in the sensible heat state into the latent heat state (the state where the steam volume is reduced by heat shrinkage.

According to the first and second cooling units 70a and 70b, the latent heat steam is supplied to the top portion of the body, and the water or steam contained in the body rises along the center of the body so as to be discharged. By having a marginal space inside the body, the means for charging the fluid to the inside the circulation conduit 50 and safety is provided.

That is, as the steam is moved along the upper plate-shaped coiled tube 51 of the circulation conduit, the heat exchange is performed in the heat storage medium 40 of the heat storage tank 30 so as to have the sensible state so as to be provided to the steam turbine 61 of the generator 60, and the sensible heat steam is sprayed to the nozzle so as to drive the steam turbine 61 and generate electricity.

At this time, the first and second cooling units 70a and 70b are generally installed under the ground, but they may be set to be partly exposed to the outside for some jobs such as fluid charge to the cooling units and repair.

Furthermore, if the steam turbine 61 of the generator 60 is driven, the sensible heat steam is moved to the second value 54b and the first cooling unit 70a through the first valve 54a in the state-changed (from gas to liquid) state with latent heat.

The operations for generating electricity with the above described configuration of the electricity-generating system using solar hear energy are described below.

Figure 3:
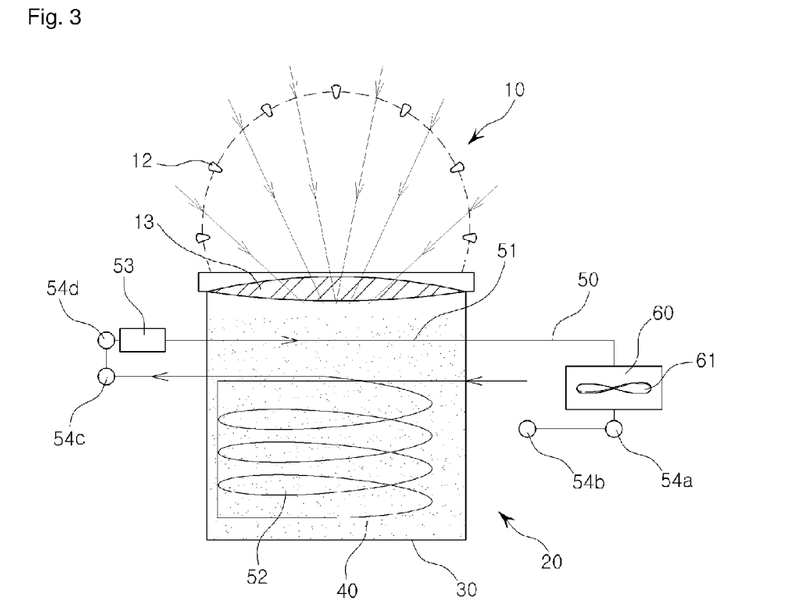
FIGS. 3 to 6 illustrate embodiments during daylight hours.

First, with respect to the daylight hours, as shown in FIG. 3, if the heat storage medium 40 within the heat storage tank 30 is heated through the condenser unit 10 and the heat exchange is performed with the upper plate-shaped coiled tube 51 and the lower coiled circulation tube 52 inside the tank, the internal side of the upper plate-shaped coiled tube 51 and the lower coiled circulation tube 52 comes to have sensible heat steam.

Furthermore, after the sensible heat steam discharged through the upper plate-shaped coiled tube 51 drives the steam turbine 61 to generate electricity, the latent heat steam, which is heat-contracted while driving the turbine, is supplied to the lower coiled circulation tube through the first value 54a and the second valve 54b for heat exchange with the heat storage medium 40, and this sensible heat steam is supplied to the upper plate-shaped tube 51 through the third value 54c and the fourth value 54d.

At this time, if the temperature of the latent heat steam, which is discharged from the generator 60 through the first value 54a, is less than a preset temperature, the steam is set to be supplied to the lower coiled circulation tube 52 promptly through the second value 54b, and even if the heat storage medium 40 is heated through the condenser unit 10 by being covered by clouds and mainly at the initial period of daylight hours.

Figure 4:
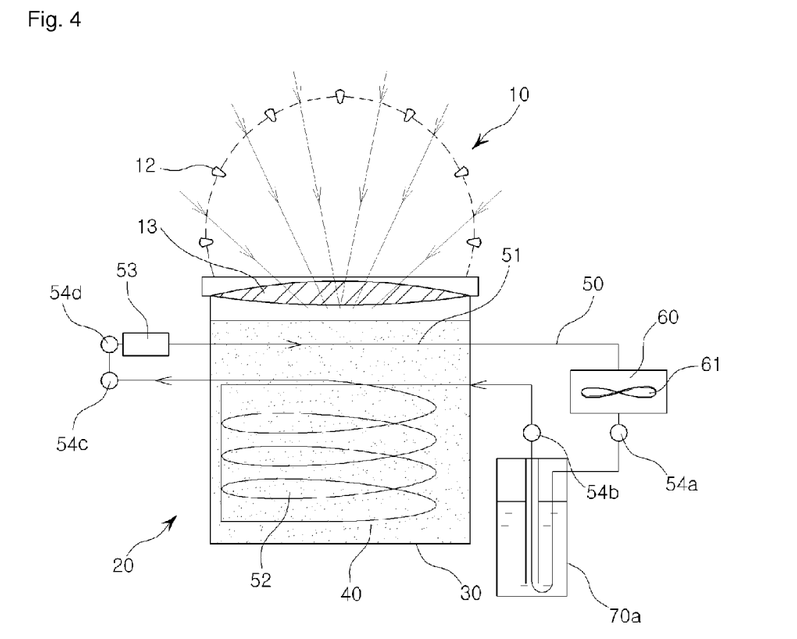

Furthermore, as shown in FIG. 4, when the heat storage medium 40 is heated to a relatively high temperature through the condenser unit 10, the state is converted into the state shown in FIG. 4.

Figure 1:
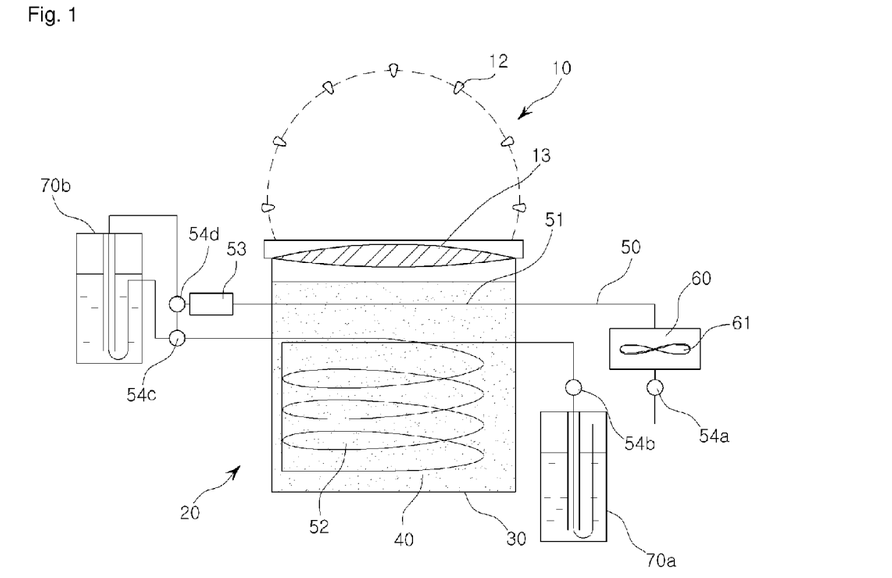
FIG. 1 illustrates an electricity-generating system using solar heat energy according to the present invention.

That is, as shown in FIG. 1, if the sensible heat steam, which is discharged through the upper plate-shaped coiled tube 51, drives the steam turbine 61 to generate electricity and the temperature of this latent heat steam is the preset temperature or higher, the steam is moved from the first value 54a to the first cooling unit 70a, and the latent heat steam is further heat-contracted while passing through the first cooling unit 70a.

At this time, if the latent steam, which is further heat-contracted through the first cooling unit 70a, is supplied to the lower coiled circulation tube 52 through the second value 54b, and the heat exchange is performed with the heat storage medium 40, the inner temperature of the heat storage tank 30 is lowered so as to prevent safety-related accidents by further heat exchange with the heat energy stored in the heat storage medium 40 compared with FIG. 1.

Furthermore, in FIG. 4, the heat storage medium 40 is heated and stored at a high temperature through the condenser unit 10, and thus the latent steam, which is supplied through the first cooling unit 70a, may be converted into sufficient sensible heat steam while passing through the lower coiled circulation tube 52 and the upper plate-shaped coiled tube 51.

Figure 5:
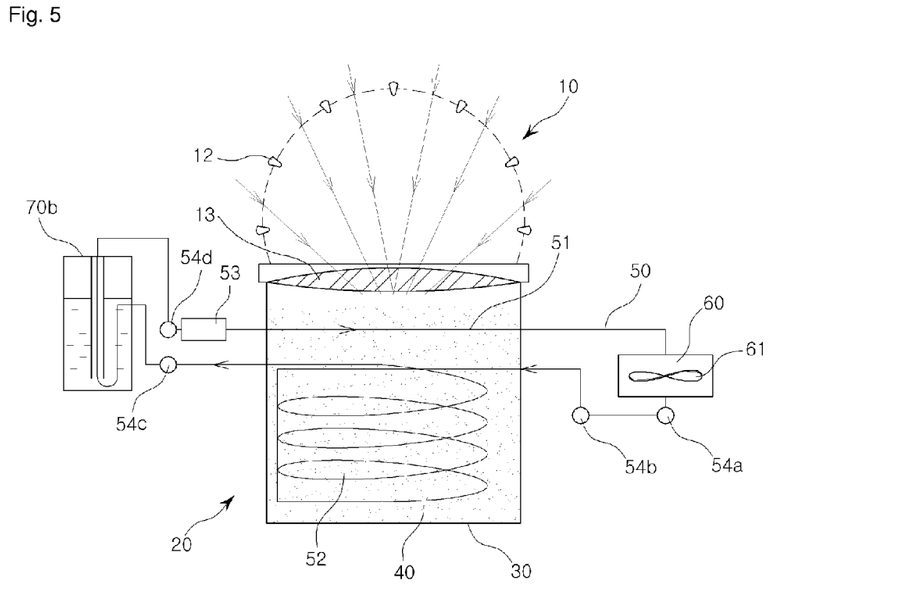

Furthermore, FIG. 5 shows preventing the rise of the internal temperature of the heat storage tank 30 to a preset temperature or unsmooth heat energy supply as the condenser unit 10 is covered by clouds for a certain amount of time during the daylight hours.

That is, in FIG. 4, the heat energy supply, which heats the heat storage medium 40 inside the heat storage tank 30 through the condenser unit 10, is not sufficient, but in the state where the internal temperature of the heat storage tank 30 is higher than a preset temperature, the sensible heat steam, which is discharged through the upper plate-shaped coiled tube 51, drives the steam turbine 61 to generate electricity, and if the temperature of the latent steam is less than a preset temperature, the steam is supplied to the lower coiled circulation tube 52 through the first value 54a and the second valve 54b for heat exchange with the heat storage medium 40, and the internal temperature of the heat storage tank 30 is cooled.

Furthermore, the sensible heat steam, which is heated through the lower coiled circulation tube 52, is set to be moved from the third value 54c to the second cooling unit 70b so as to be changed to the latent steam, and this latent steam is supplied to the upper plate-shaped coiled tube 51 through the fourth value 54d.

Hence, the heat exchange is performed with the heat storage medium 40 in the upper plate-shaped coiled tube 51 so as to be changed to the sensible heat steam, and the internal temperature of the heat storage tank 30 is further cooled down.

Figure 6:
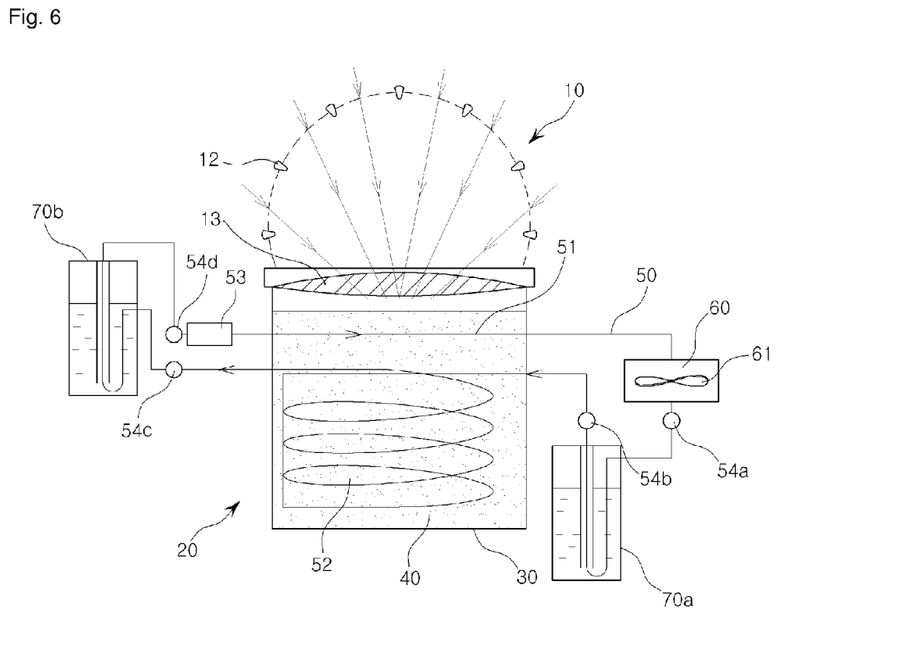

Furthermore, FIG. 6 shows that the heat energy supply through the condenser unit 10 is sufficient during daylight hours, and the internal temperature of the heat storage tank 30 rises to a temperature greater than a preset temperature.

That is, in FIG. 6, in the state where the heat energy supply for heating the heat storage medium inside the heat storage tank 30 through the condenser unit 10 is sufficient, safety-related accidents due to the situation that the internal temperature of the heat storage tank 30 becomes higher than a preset temperature are prevented, and this operation generates electricity as the sensible steam, which is discharged through the upper plate-shaped coiled tube 51, drives the steam turbine 61, the latent steam is moved from the first value 54a to the first cooling unit 70a, and the latent steam is further heat-contracted while passing through the first cooling unit 70a.

Furthermore, if the latent heat steam, which has been further heat-contracted through the first cooling unit 70a, is supplied to the lower coiled circulation tube 52 through the second valve 54b, and heat exchange with the heat storage medium is performed, then the heat exchange with the heat energy stored in the heat storage medium 40 is further performed, thereby firstly cooling the internal temperature of the heat storage tank 30.

Furthermore, the sensible heat steam, which is heated through the lower coiled circulation tube 52, is changed again to the latent heat steam as the steam is moved from the third value 54c to the second cooling unit 70b, and this latent heat steam is supplied to the upper plate-shaped coiled tube 51 through the fourth value 54d.

Hence, as the heat exchange with the heat storage medium is performed in the upper plate-shaped coiled tube 51, the steam is changed to the sensible heat steam, and the internal temperature of the heat storage tank 30 is secondly cooled down.

Furthermore, the operation of the system of the present invention in hours other than the daylight hours is described below.

First, in hours other than the daylight hours, in the state where the heat energy supply through the condenser unit 10 is limited, the electricity is generated using the heat energy stored inside the heat storage tank 30, and the capacity of the heat storage tank 30 may be adjusted according to the daylight hours and the hours other than the daylight hours.

Figure 7:
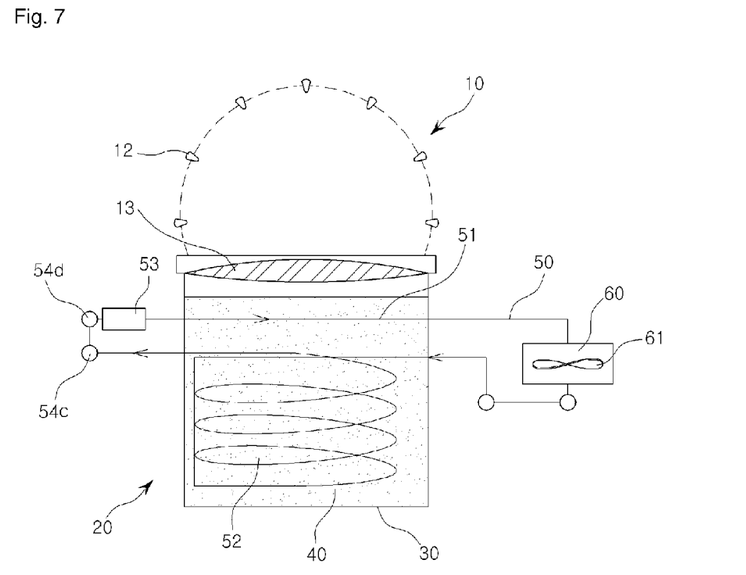
FIGS. 7 and 8 illustrate embodiments at hours other than daylight hours.

FIG. 7 has the same circulation line as that of FIG. 1, but the heat exchange with the upper plate-shaped coiled tube 51 and the lower coiled circulation tube 52 inside the tank is performed only with the heat energy of the heat storage medium 40 stored in the heat storage tank 30.

Furthermore, after the sensible heat steam, which is discharged through the upper plate-shaped coiled tube 51, drives the steam turbine 61 to generate electricity, the latent heat steam, which has been heat-contracted while driving the turbine, is supplied to the lower coiled circulation tube 52 through the first value 54a and the second value 54b for the heat exchange with the heat storage medium 40, and this latent heat steam is supplied to the upper plate-shaped coiled tube 51 through the third value 54c and the fourth value 54d.

Such a circulation configuration is mainly used in hours other than the daylight hours so as to generate electricity, and the operation hours of the circulation configuration may be adjusted according to the heat storage tank 30 and the heat storage medium 40.

Figure 8:
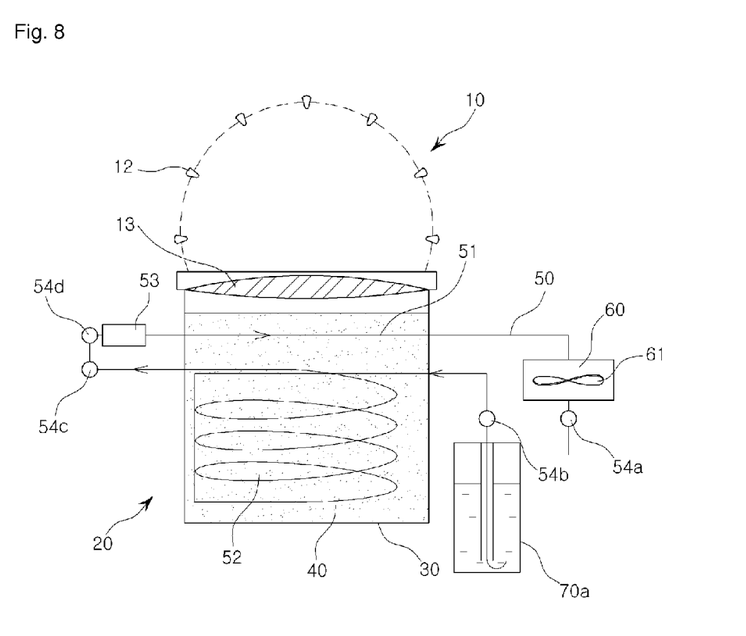

Furthermore, as in FIG. 8, in the state where the internal temperature of the heat storage tank 30 rises by heating right after the daylight hours, this is protected, and the circulation line as in FIG. 4 is formed.

Hence, if the latent heat steam, which is further heat-contracted through the first cooling unit 70a, is supplied to the lower coiled circulation tube 52 through the second valve 54b, and the heat exchange with the heat storage medium 40 is performed, the further heat exchange with the heat energy, which is stored in the heat storage medium 40, is performed, thereby lowering the internal temperature of the heat storage tank 30 and preventing safety-related accidents.

Likewise, according to the present invention, the heat energy of the solar light during the daylight hours is stored, and thus electricity may be generated during both the daytime and nighttime, and the electricity power generated for unit area increases, thereby reducing the unit costs for the electricity power.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An electricity-generating system using solar heat energy comprises: a fixed body (11) in the form of a mesh net having mesh openings, which has a spherically-shaped top portion extending above the ground; a condenser lens (12) coupled to each of the mesh openings of the fixed body (11), which focuses sunlight at the bottom portion of the fixed body (11); a condenser unit (10) installed at the bottom portion of the fixed body (11), which includes a collector lens (13) that increases the concentration of energy focused through the condenser lens (12) and transfers heat to the bottom of the body thereof; a heat storage tank (30) combined with the bottom portion of the fixed body (11), which has a heat storage medium (40) filled inside the body thereof, and which heats and stores the heat storage medium (40) by means of heat energy transferred through the collector lens (13); a circulation conduit (50) which has an upper plate-shaped coiled tube (51) and a lower coiled circulation tube (52), which is stacked and contained in the heat storage tank (30), and which selectively moves steam to each component through the operation of a valve of a circulation pump (53); a generator (60) for generating electricity when steam in the upper plate-shaped coil tube (51) of the circulation conduit (50) is heated and converted to a sensible heat state in the heat storage tank (30) and the sensible heat steam is discharged in order to drive a steam turbine (61); a first heat-sensitizing unit (70a) for further thermally contracting the sensible heat steam that passes through the generator (60); and a generating unit (20) having latent heat steam that is thermally contracted by the generator or the first heat sensitizing unit (70a) pass through the lower coil circulation tube (52) of the circulation conduit (50) and through the inside of the heat storage tank (30) to be heated, and including a second heat-sensitizing unit (70b) thermally contracting the heated sensible heat steam, wherein the heat storage medium (40) in the heat storage tank (30) is heated by the condenser unit (10) and performs heat exchange with the upper plate-shaped coil tube (51) and the lower coil circulation tube (52) in the tank, sensible heat steam is fed therein, the sensible heat steam discharged through the upper plate-shaped coil tube (51) drives the steam turbine (61) in order to generate electricity, latent heat steam is further thermally contracted when passing through the first valve (54a) and the first heat-sensitizing unit (70a), the latent heat steam is supplied to the lower coil circulation tube (52) through a second valve (54b) so as to exchange heat with the heat storage medium (40), and the sensible heat steam heated in the lower coil circulation tube (52) is thermally contracted when passing through a third valve (54c) and the second heat-sensitizing unit (70b), and is supplied to the upper plate-shaped coil tube (51) through a fourth valve (54d) in order to be circulated.

* * * * *